United States Patent
Gehman

[19]

[11] Patent Number: 5,979,972
[45] Date of Patent: Nov. 9, 1999

[54] FOLDING TRAILER WITH INTEGRAL CARGO PLATFORM

[75] Inventor: Dana K. Gehman, Somerset, Pa.

[73] Assignee: Fleetwood Folding Trailers, Inc., Somerset, Pa.

[21] Appl. No.: 09/281,885

[22] Filed: Mar. 31, 1999

Related U.S. Application Data

[60] Provisional application No. 60/083,510, Apr. 29, 1998.

[51] Int. Cl.$^6$ ...................................................... B60P 3/355
[52] U.S. Cl. ........................... 296/173; 296/181; 224/401
[58] Field of Search .................................... 296/181, 173; 224/401

[56] References Cited

U.S. PATENT DOCUMENTS

| | | | |
|---|---|---|---|
| 2,497,597 | 2/1950 | Gatewood | 224/401 |
| 3,429,608 | 2/1969 | Farnum | 296/173 |
| 3,801,132 | 4/1974 | Haynie et al. | 224/401 |
| 3,989,265 | 11/1976 | Smiley | 224/401 |
| 4,157,200 | 6/1979 | Johnson | 296/173 |
| 4,967,942 | 11/1990 | McGruder | 224/401 |
| 5,314,200 | 5/1994 | Phillips | 296/173 |
| 5,505,515 | 4/1996 | Turner | 296/173 |
| 5,865,499 | 2/1999 | Keyser | 296/173 |

*Primary Examiner*—Gary C. Hoge
*Attorney, Agent, or Firm*—Webb Ziesenheim Logsdon Orkin & Hanson, P.C.

[57] ABSTRACT

A folding trailer having an integral cargo platform generally includes a chassis having wheels and a towing hitch, a trailer body attached to the chassis such that a front end of the trailer body faces the towing hitch and the platform attached to the chassis between the front end of the trailer body and the towing hitch. The platform generally includes a substantially flat and substantially rigid core member and a layer of substantially abrasion and weather resistant material positioned on the core member. The platform further includes a first side and a second side and is configured to be attached to the chassis such that the second side contacts the chassis. The first side of the platform has a surface defined by the layer of abrasion and weather resistant material, with the surface shaped to limit movement of cargo received on the first side of the platform.

20 Claims, 8 Drawing Sheets

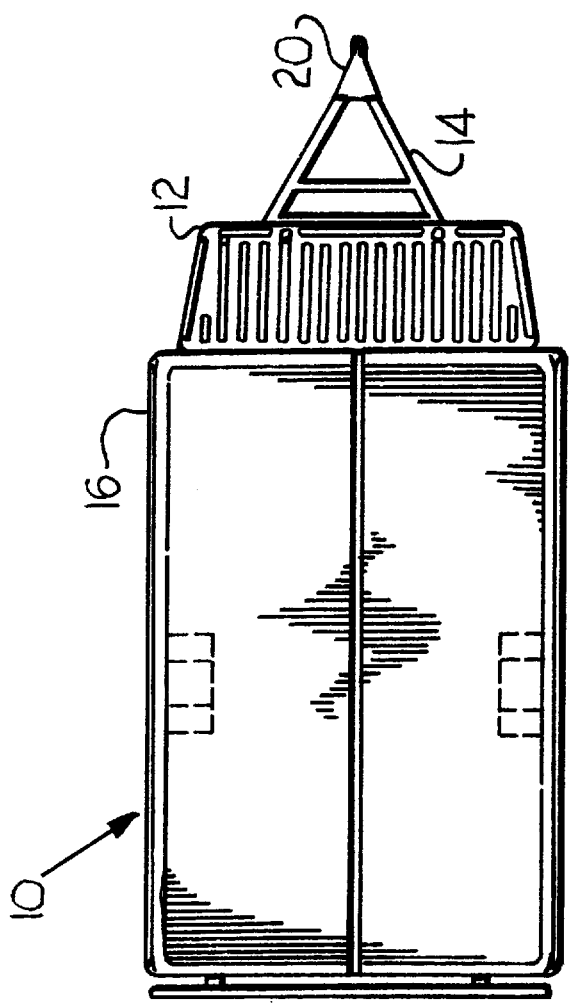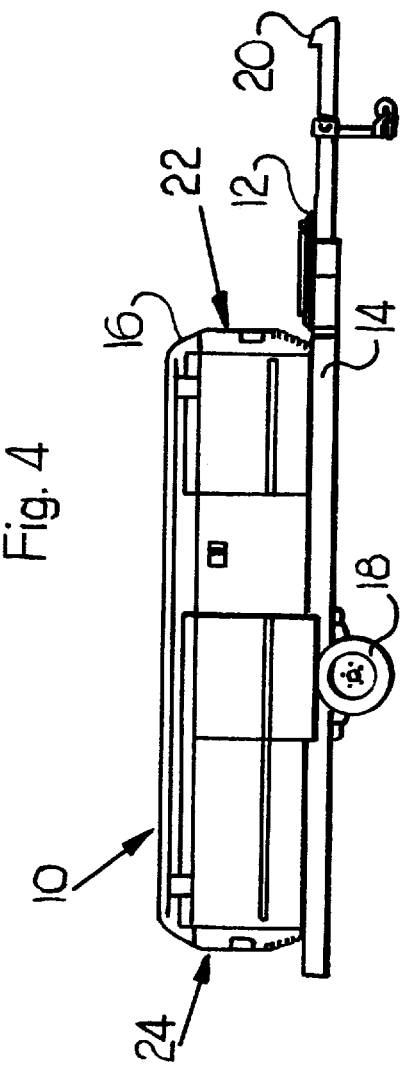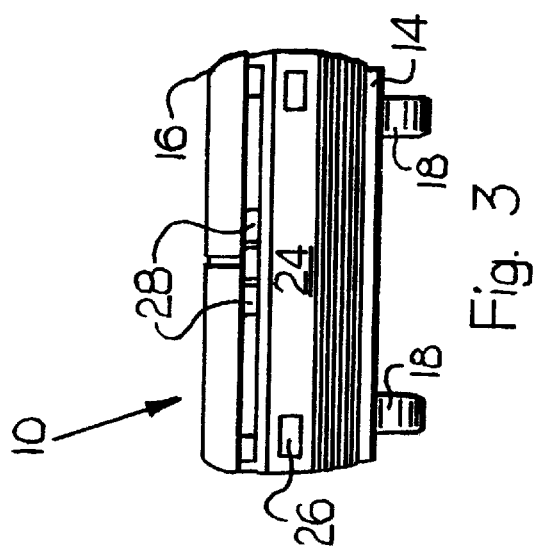

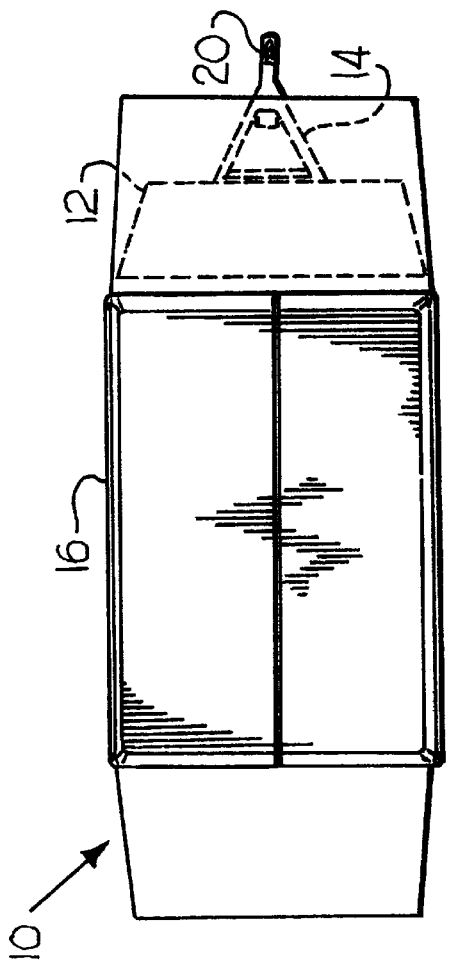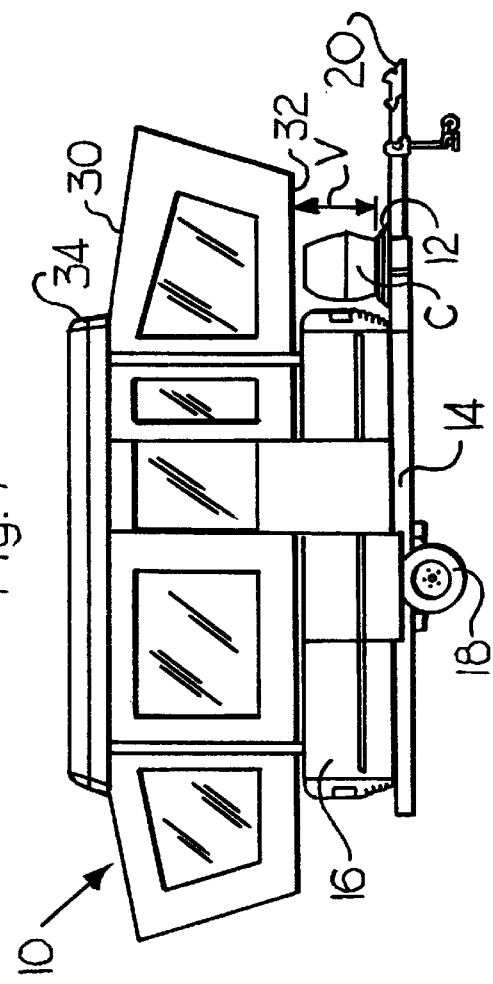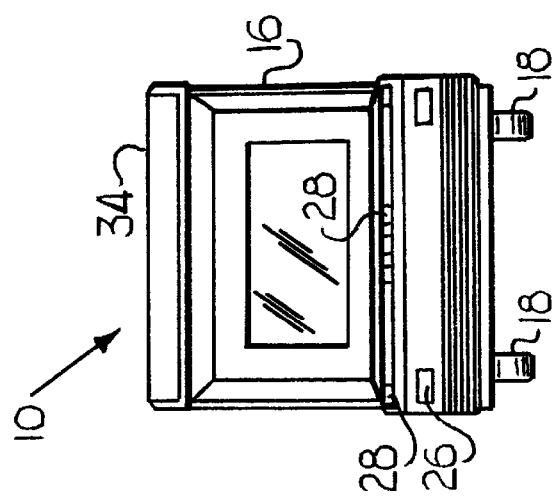

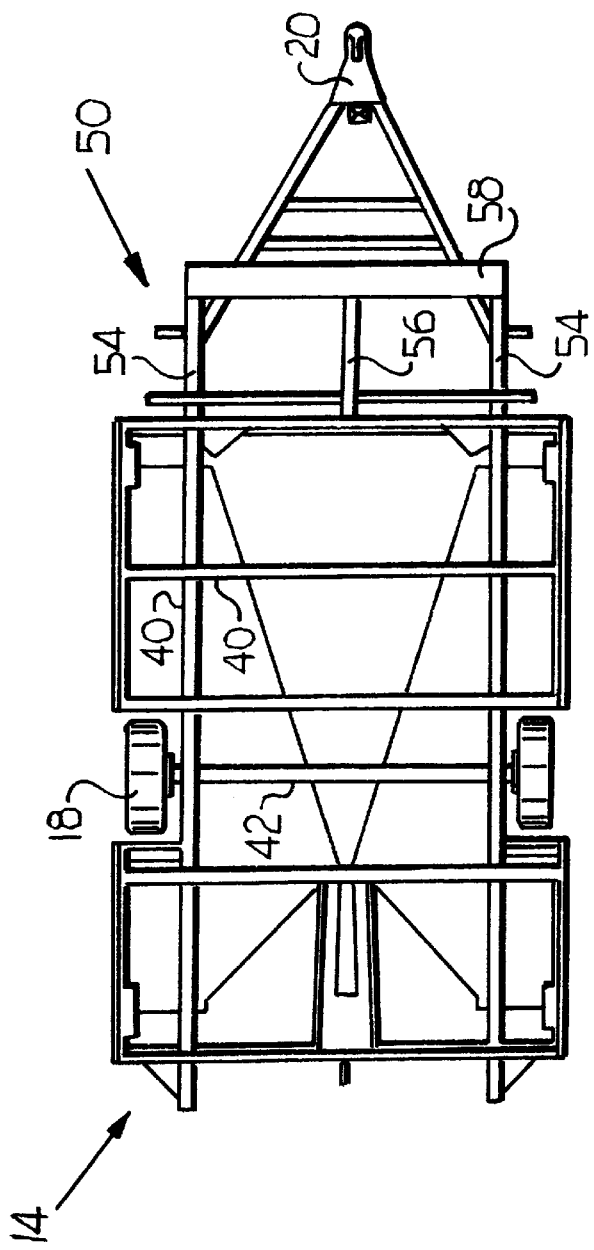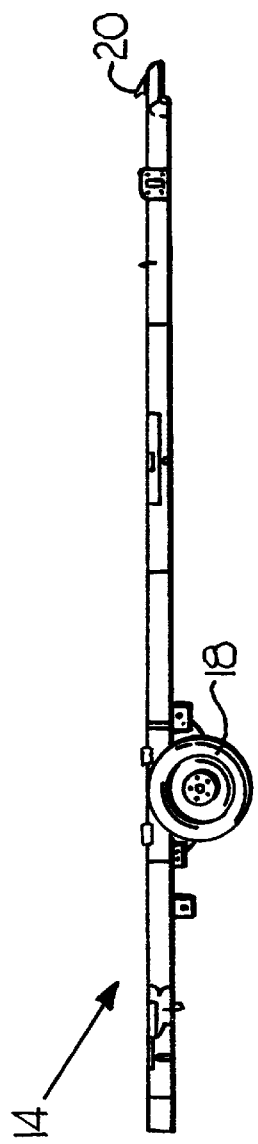

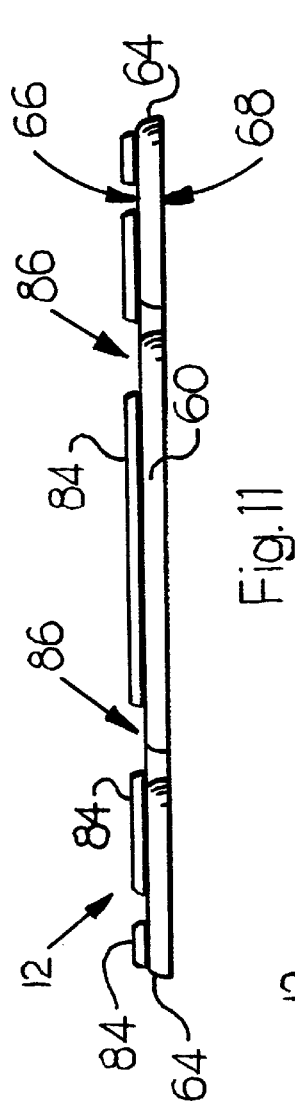
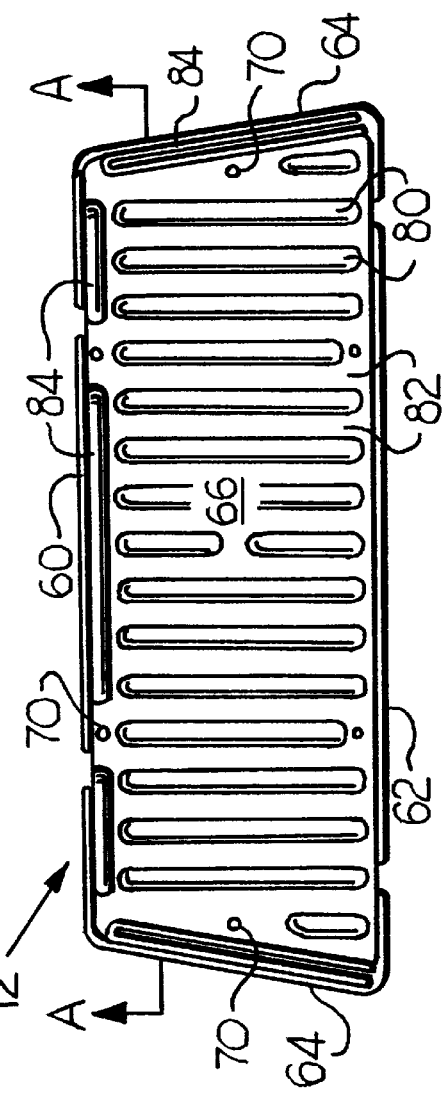
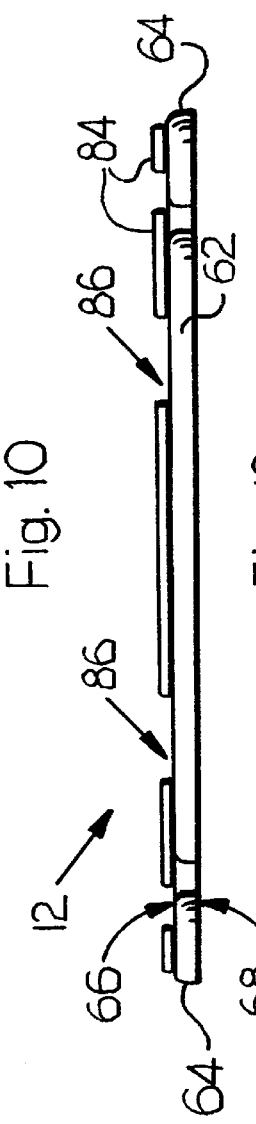
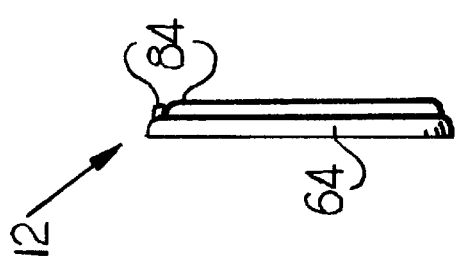

FOLDING TRAILER WITH INTEGRAL CARGO PLATFORM

CROSS REFERENCE TO RELATED APPLICATION

This application claims the benefit of U.S. Provisional Application Ser. No. 60/083,510 filed Apr. 29, 1998, entitled "Folding Trailer With Integral Cargo Platform".

BACKGROUND OF THE INVENTION

1. Field of the Invention

The present invention relates to recreational vehicles having a cargo carrying device and, more particularly, to folding camping trailers having a cargo carrying device.

2. Description of the Prior Art

The use of recreational vehicles for comfortable travel is well known. Recreational vehicles include those that can be driven down the road as a self-contained unit and others that are towed such as folding camping trailers. Besides providing shelter and creature comforts away from home, recreational vehicles must enable the owner to transport all manner of supplies and lifestyle accessories, such as bicycles, boats, camping and hunting gear, and the like. This gear is commonly known as cargo.

Folding camping trailers (hereinafter referred to as "folding trailers"), wherein major design goals include low cost, compact size and light weight, present a particular challenge to their designers and manufacturers in providing cargo-carrying accommodations for large items that folding trailer owners are likely to transport in the use of their folding trailers. Such items may include, for example, large storage boxes as are commonly found in beds of pickup trucks, bicycles, lawn furniture, ice chests, firewood, children's playthings and portable water storage tanks.

The current arrangements in folding trailers for carrying such large cargo items include rooftop cargo racks, enclosed and integrated trunks, commonly known in the art as integral storage trunks, and owner-fabricated devices of all sorts. There are shortcomings with each of these arrangements.

The shortcomings of rooftop cargo racks are that they are expensive and must be permanently installed by drilling through the folding trailer roof. Additionally, rooftop cargo racks are difficult to access due to their location atop the folding trailer and are inaccessible when the folding trailer is setup. Also, rooftop cargo racks can undesirably raise a folding trailer's center of gravity. Further, rooftop cargo racks can obstruct the driver's rearward vision when large objects are placed upon them. Holes drilled improperly when installing the rooftop cargo rack may cause leaks in the roof.

Integral storage trunks likewise have shortcomings. For example, they provide only restricted access to their contents when the folding trailer is opened and are limited by small access doors. In addition, integral storage trunks are generally unable to accommodate large, odd-shaped items such as bicycles. Integral storage trunks can also add additional cost and weight to the folding trailer.

Owner-fabricated devices are often of uncontrolled integrity and are typically located at the rear of the folding trailer. The rear of the folding trailer is an undesirable location for placing owner-fabricated devices and the accompanying additional weight of the cargo for numerous reasons. First, the extended length reduces the departure angle of the folding trailer and, thus, the devices often drag on the ground when the folding trailer negotiates inclines. Additionally, these devices often obscure the visibility of the folding trailer's lights to following vehicles. Finally, the weight of the cargo added to the rear of the folding trailer can adversely affect the folding trailer's towing characteristics.

An object of the present invention is to provide a folding trailer having a cargo carrying device that adds minimal cost and weight to the folding trailer.

It is a further object of the present invention to provide a folding trailer having a cargo carrying device that can accommodate large, odd-shaped cargo items.

Accordingly, I have invented a folding trailer having a chassis, a trailer body attached to the chassis and an integral cargo platform attached to the chassis adjacent the trailer body. The chassis includes wheels and a towing hitch. The trailer body is attached to the chassis such that a front end of the trailer body faces the towing hitch. The cargo platform is attached to the chassis between the front end of the trailer body and the towing hitch. The cargo platform includes a substantially flat and substantially rigid core member and a layer of substantially abrasion and weather resistant material positioned on the core member. The cargo platform further includes a first side and a second side and is configured to be attached to the chassis such that the second side contacts the chassis. The first side has a surface defined by the layer of abrasion and weather resistant material, with the surface shaped to limit movement of cargo received on the first side of the cargo platform.

The cargo platform may be polygonal-shaped. Preferably, the cargo platform is trapezoidal-shaped and is spaced from the front end of the trailer body. The layer of abrasion and weather resistant material may enclose the core member.

The surface of the first side may define a plurality of substantially parallel recesses, with each of the recesses separated from an adjacent recess by a rib portion. The cargo platform may further include a first edge and a second edge and the recesses preferably extend substantially a distance from the first edge to the second edge. In addition, the surface of the first side may incline from the first edge toward the second edge such that liquid on the surface of the first side flows toward the second edge. The surface of the first side of the cargo platform may form a plurality of raised lip portions positioned on the first side of the cargo platform to limit the movement of the cargo received on the first side of the cargo platform.

In the trapezoidal-shaped embodiment of the cargo platform, the cargo platform is defined by a first edge, a second edge and two lateral edges. The lip portions are preferably formed along the first edge and along each of the lateral edges of the cargo platform in this embodiment of the cargo platform.

The chassis preferably further includes an extended front support structure supporting the cargo platform. The cargo platform may also have a plurality of tie-down loops attached to the first side of the cargo platform for securing the cargo received on the first side of the cargo platform.

Further details and advantages of the present invention will become apparent with the following detailed description, in conjunction with the drawings, wherein like reference numerals represent like parts throughout.

BRIEF DESCRIPTION OF THE DRAWINGS

FIG. 2 is a side elevational view of the folding trailer shown in FIG. 1;

FIG. 3 is a rear elevational view of the folding trailer shown in FIG. 1;

FIG. 4 is a top plan view of the folding trailer shown in FIG. 1;

FIG. 5 is a side elevational view of the folding trailer shown in FIG. 1 in an open configuration;

FIG. 6 is a rear elevational view of the folding trailer shown in FIG. 5;

FIG. 7 is a top plan view of the folding trailer shown in FIG. 5;

FIG. 8 is a top plan view of a chassis of the folding trailer shown in FIG. 1;

FIG. 9 is a side elevational view of the chassis shown in FIG. 8;

FIG. 10 is a top plan view of the cargo platform shown in FIG. 1;

FIG. 11 is a front view of the cargo platform shown in FIG. 10;

FIG. 12 is a rear view of the cargo platform shown in FIG. 10;

FIG. 13 is a side view of the cargo platform shown in FIG. 10;

DETAILED DESCRIPTION OF THE PREFERRED EMBODIMENTS

Figure 1:
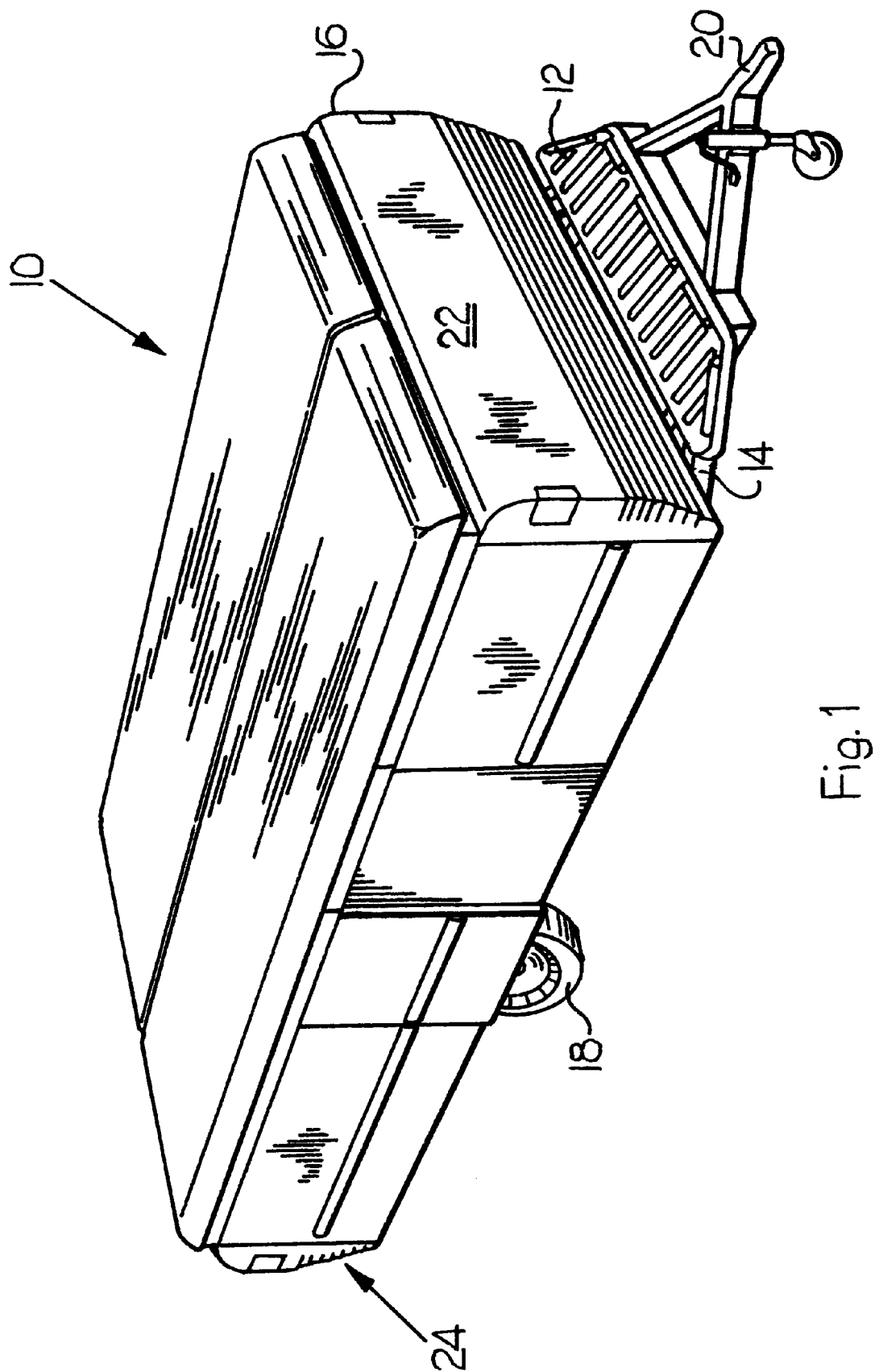
FIG. 1 is a perspective view of a folding trailer having an integral cargo platform made in accordance with the present invention, with the folding trailer shown in a closed configuration.

FIGS. 1–4 show a folding camping trailer 10 (hereinafter "the folding trailer 10") having an integral cargo platform 12 (hereinafter "the platform 12") made in accordance with the present invention. The folding trailer 10 is shown in a closed position in which it can be towed by a towing vehicle (not shown) such as a car, mini-van, truck or sport utility vehicle. The folding trailer 10 generally includes a chassis 14, a trailer body 16 attached to the chassis 14 and the platform 12 attached to the chassis 14 adjacent the trailer body 16. The chassis 14 includes wheels 18 and an integrally formed towing hitch 20. The trailer body 16 includes a first or front end 22 and a second or rear end 24. The trailer body 16 is attached to the chassis 14 so that the front end 22 of the trailer body 16 faces the towing hitch 20. The platform 12 is attached to the chassis 14 between the front end 22 of the trailer body 16 and the towing hitch 20. Preferably, as shown in FIG. 2, the platform 12 is spaced several inches or so from the front end 22 of the trailer body 16 to allow dirt, accumulated moisture and/or foreign objects to egress from the platform 12 between the platform 12 and the front end 22 of the trailer body 16. However, the platform 12 may also be attached to the chassis 14 to be in contact with the front end 22 of the trailer body 16 with no spacing therebetween.

As shown in FIG. 4, the rear end 24 of the trailer body 16 includes lighting 26 and reflectors 28 which are viewable by drivers in vehicles following the folding trailer 10 when the folding trailer 10 is being towed. A propane tank (not shown) is generally attached to a support which is positioned in the triangular area formed by the chassis 14 and attached to the chassis 14 between the platform 12 and the trailer hitch 20. The propane tank provides propane gas for a stove and/or refrigerator (not shown) located within the trailer body 16.

FIGS. 5–7 show the folding trailer 10 in an open configuration in which the folding trailer 10 is used while camping. In the open configuration, the trailer body 16 defines an enclosed living area 30 that projects over the chassis 14 and the platform 12. The living area 30 includes an underside 32 that extends over the platform 12. The underside 32 of the living area 30 and the platform 12 define a vertical open space V that permits access to cargo C positioned on the platform 12. The cargo C shown in FIG. 5 is a portable storage trunk that could also be used in the bed of a pickup truck. The trailer body 16 further includes a substantially rigid roof 34 atop the living area 30 which serves to protect the living area 30 from damage.

Referring now to FIGS. 8 and 9, the chassis 14 of the folding trailer 10 is shown in greater detail. The chassis 14 generally includes the wheels 18, the integrally formed towing hitch 20 and a plurality of rigid support members 40 that are welded or mechanically fastened together to form the chassis 14. The wheels 18 are connected by an axle 42. The chassis 14 further includes an extended front support structure 50 for supporting the platform 12 (not shown). The extended front support structure 50 provides additional space at the front of the chassis 14 for the attachment of the platform 12 and, further, the structural support necessary to support the platform 12 and any cargo received on the platform 12. In particular, the front support structure 50 includes two extended first or front supports 54, a center brace member 56 and at least one cross member 58 connecting the front supports 54 and the center brace member 56. The front supports 54, the center brace member 56 and the cross member 58 are welded or mechanically fastened together to form the front support structure 50. The front support structure 50 may be sized to accommodate different sized platforms 12 and, preferably, is sized to the dimensions of the platform 12. However, the width of the front support structure 50 is generally limited to the overall width of the trailer body 16 as shown, for example, in FIG. 6. The chassis 14 is preferably made of steel.

Referring to FIGS. 10–13, the platform 12 is shown unattached from the folding trailer 10 (not shown). The platform 12 may be polygonal-shaped and, preferably, as shown in FIG. 10, is trapezoidal-shaped. The platform 12 may also be circular or oval-shaped. The platform 12 is defined by a first edge or leading edge 60, a second edge or trailing edge 62 and lateral edges 64. The platform 12 further includes a first or top side 66 and a second or bottom side 68. A plurality of holes 70 is defined in the platform 12 extending from the first side 66 to the second side 68 of the platform 12.

Figure 14:
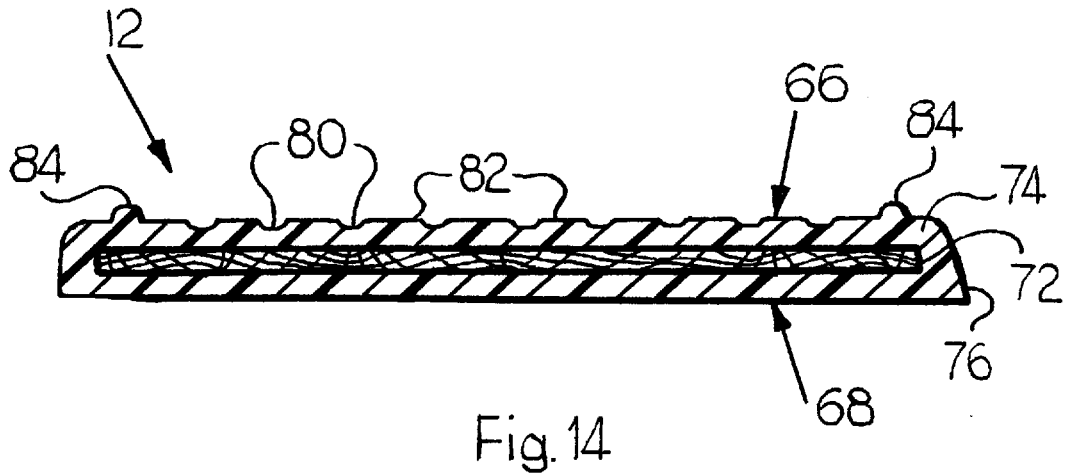
FIG. 14 is a section taken along lines A—A in FIG. 10.
Figure 15:
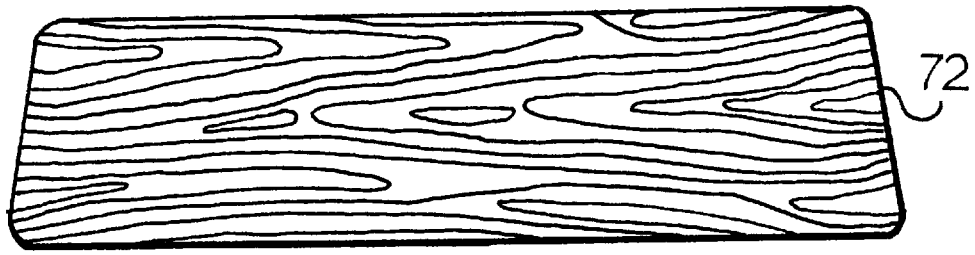
FIG. 15 is a plan view of a subfloor of the cargo platform shown in FIG. 10.

FIG. 14 shows a cross section of the platform 12 shown in FIG. 10 and FIG. 15 shows a subfloor of the platform 12. As shown in FIGS. 14 and 15, the platform 12 is generally formed by the subfloor or, more particularly, a core member 72 made of a substantially flat and substantially rigid material and a layer of substantially abrasion and weather resistant material 74 positioned on the core member 72. The core member 72 is preferably trapezoidal-shaped as shown in FIG. 15. The layer of substantially abrasion and weather resistant material 74 is positioned on the core member 72 and, preferably, completely encloses the core member 72 to form the platform 12. The layer of substantially abrasion and weather resistant material 74 forms a surface 76 of the platform 12. The layer of substantially abrasion and weather resistant material 74 is preferably an abrasion and weather resistant plastic such as polyethylene. The core member 72 is preferably made of wood or another substantially rigid material. The core member 72 and the layer of substantially abrasion and weather resistant material 74 may be made of the same or different materials.

Referring back to FIGS. 10–15, the layer of substantially abrasion and weather resistant material 74 defines a plurality of substantially parallel recesses 80 on the first side 66 of the platform 12. Each of the recesses 80 is separated from an adjacent recess 80 by a rib portion 82. As shown in FIG. 10, the recesses 80 extend substantially a distance from the first or leading edge 60 to the second or trailing edge 62. In addition, the layer of abrasion and weather resistant material 74 forms a plurality of raised lip portions 84 on the first side 66 of the platform 12. The raised lip portions 84 are positioned on the first side 66 of the platform 12 along the leading edge 60 and along each of the lateral edges 64 of the platform 12. A plurality of gaps 86 is defined between the lip portions 84. The gaps 86 are defined between the lip portions 84 along the leading edge 60 of the platform 12. In addition, the gaps 86 are defined between the lip portions 84 along the leading edge 60 of the platform 12 and the lip portions 84 along the lateral edges 64 of the platform 12. The layer of abrasion and weather resistant material 74 defining the surface 76 of the platform 12 may form the surface 76 on the first side 66 of the platform 12 to incline from the leading edge 60 toward the trailing edge 62 of the platform 12 so that liquid on the surface 76 of the first side 66 flows toward the trailing edge 62 and drains therefrom.

Figure 16:
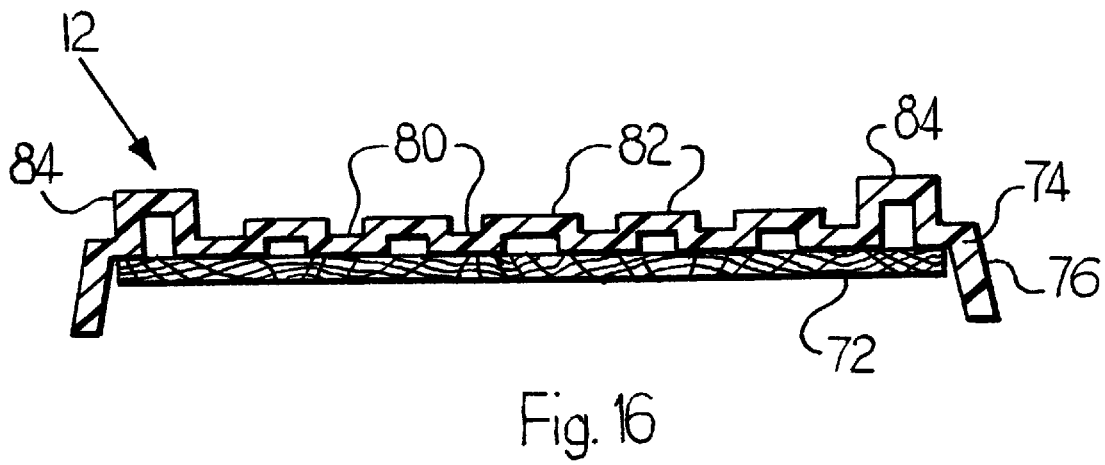
FIG. 16 is a sectional view of an alternate embodiment of the cargo platform shown in FIG. 10.

FIG. 16 is a sectional view of another embodiment of the platform 12. In the embodiment of the platform 12 shown in FIG. 16, the layer of abrasion and weather resistant material 74 is positioned only on one side of the core member 72 and extends over the edges of the core member 72. Otherwise, the embodiment of the platform 12 shown in FIG. 16 is identical to the embodiment of the platform 12 discussed hereinabove.

Figure 17:
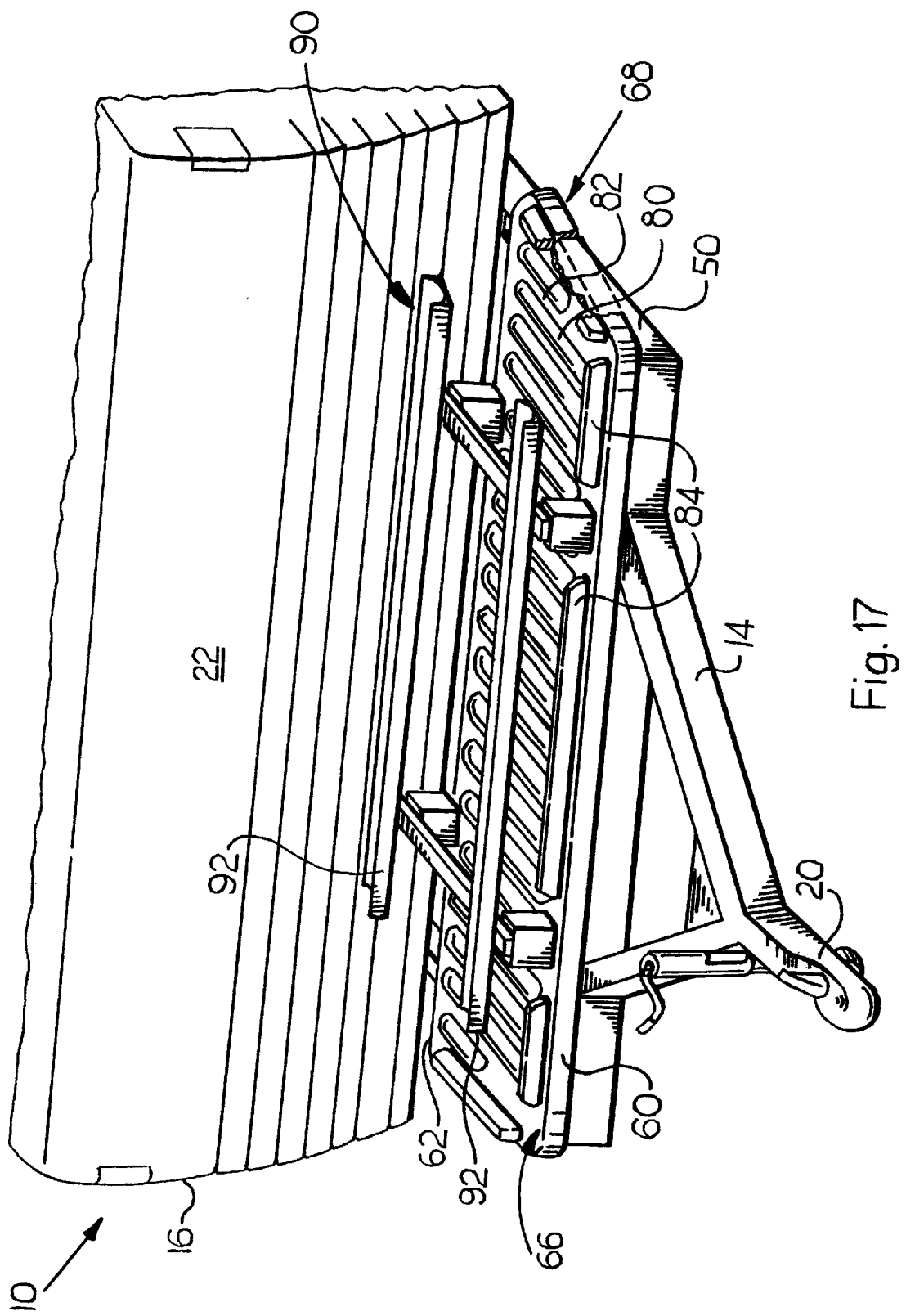
FIG. 17 is a perspective view of the folding trailer having an integral cargo platform with a mounting device attached to the cargo platform.

Referring to FIG. 17, the platform 12 is configured to be attached to the front support structure 50 of the chassis 14 with the leading edge 60 of the platform 12 facing the towing hitch 20 and the trailing edge 62 of the platform 12 facing the front end 22 of the trailer body 16. The platform 12 is adapted further to be attached to the front support structure 50 of the chassis 14 with the second side 68 of the platform 12 in contact with the front support structure 50 and the first side 66 exposed to receive cargo thereon. The platform 12 is preferably bolted to the front support structure 50, or attached to the front support structure 50 with other similar mechanical fastening devices, as will be appreciated by those skilled in the art.

FIG. 17 further shows a mounting device 90 attached to the first side 66 of the platform 12. The mounting device 90 includes two substantially parallel rails 92 suitable for securing bicycles (not shown). The mounting device 90 is preferably bolted to the platform 12 through the holes 70 in the platform 12, or attached to the platform 12 with other similar mechanical fastening devices.

Figure 18:
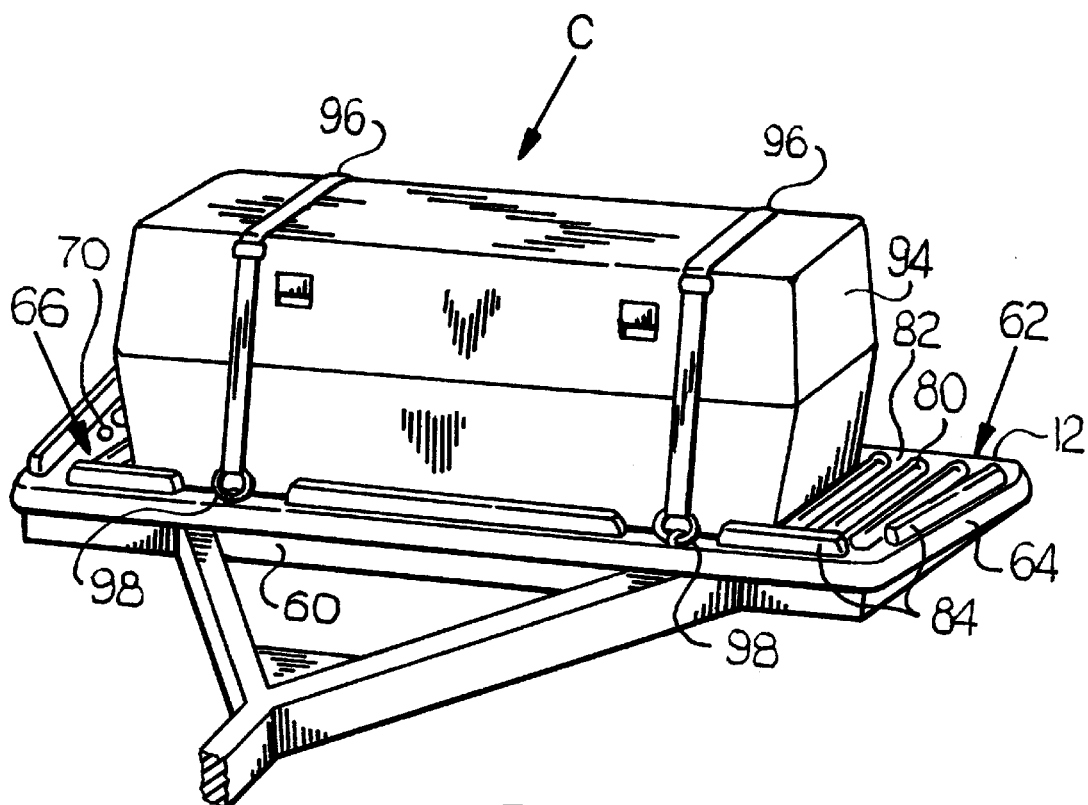
FIG. 18 is a perspective view of the chassis and the cargo platform with a portable storage trunk positioned on the cargo platform.
Figure 19:
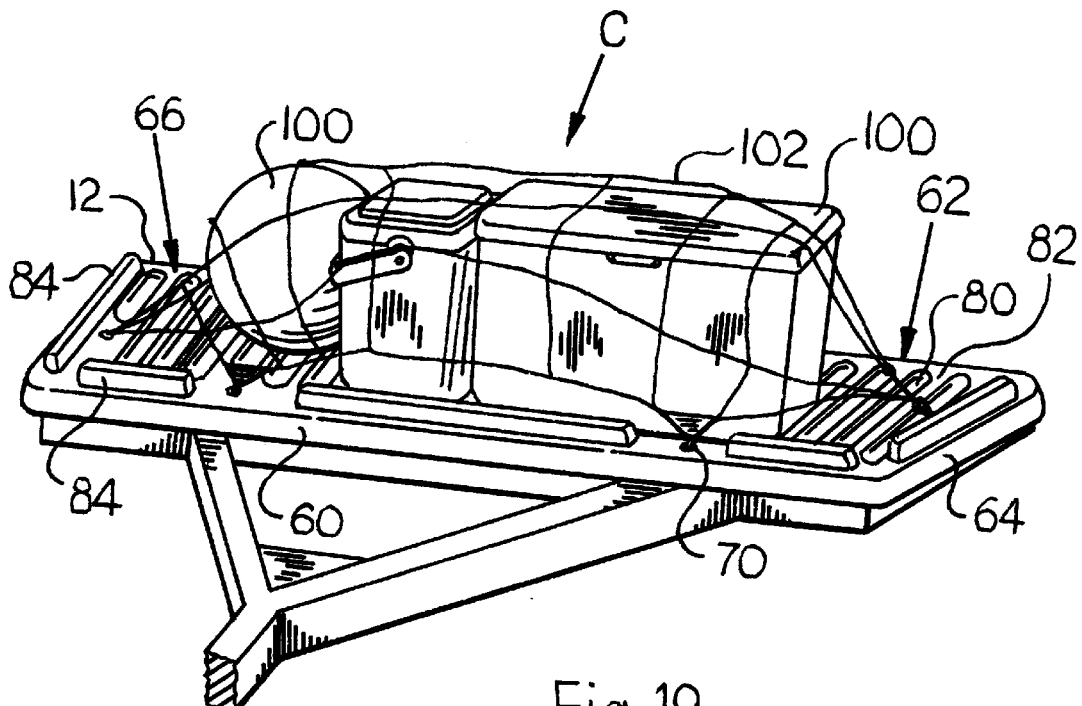
FIG. 19 is a perspective view of the chassis and the cargo platform with various odd-sized objects positioned on the cargo platform.

Referring now to FIGS. 18 and 19, the recesses 80 and the raised ribs 82 on the first side 66 of the platform 12 are adapted to channel dirt and accumulated moisture on the first side 66 away from the cargo C positioned on the first side 66 of the platform 12 and into the recesses 80. Additionally, as mentioned previously, the layer of substantially abrasion and weather resistant material 74 may form the first side 66 of the platform 12 to incline from the leading edge 60 toward the trailing edge 62 of the platform 12 so that liquid on the first side 66 flows toward the trailing edge 62 of the platform 12 and drains from the platform 12 over the trailing edge 62.

FIGS. 18 and 19 further show the raised lip portions 84 formed on the first side 66 of the platform 12. The raised lip portions 84 are positioned on the first side 66 of the platform 12 to restrain the cargo C positioned on the platform 12 and prevent it from sliding off the platform 12 during transit. The raised lip portions 84 are noncontinuous along the leading edge 60 and the lateral edges 64 of the platform 12. The trailing edge 62 of the platform 12 preferably does not have raised lip portions 84 formed along the trailing edge 62 so that dirt, accumulated moisture and/or foreign objects can egress from the platform 12 from the trailing edge 62 of the platform 12.

FIG. 18 in particular shows the cargo C in the form of a portable storage box 94 secured by straps 96 to a plurality of tie-down loops 98. The tie-down loops 98 are attached to the first side 66 of the platform 12 and are preferably secured in the holes 70 in the platform 12. The tie-down loops 98 are preferably bolted to the platform 12, or attached to the platform 12 with other similar mechanical fastening devices.

FIG. 19 in particular shows various items 100 held in place on the first side 66 of the platform 12 with cargo netting 102. The cargo netting 102 may be attached to the first side 66 of the platform 12 by tying the cargo netting 102 through the holes 70 in the platform 12.

The folding trailer with integral cargo platform made in accordance with the present invention includes a carrying device that adds minimal cost and weight to the folding trailer. Additionally, as shown in FIGS. 17–19, the folding trailer with integral cargo platform provides a carrying device that is able to accommodate large, odd-shaped cargo items.

Although this invention has been described with reference to preferred embodiments, obvious modifications and alterations of the invention may be made without departing from the spirit and scope of the invention. The scope of the present invention is defined by the appended claims and equivalents thereto.

What is claimed is:

1. A folding trailer having an attached cargo platform, comprising:

a chassis having wheels and a towing hitch;

a trailer body attached to the chassis such that a front end of the trailer body faces the towing hitch; and the platform attached to the chassis between the front end of the trailer body and the towing hitch, the platform comprising:

a substantially flat and substantially rigid core member; and a layer of substantially abrasion and weather resistant material positioned on the core member, wherein the platform includes a first side and a second side and is configured to be attached to the chassis such that the second side contacts the chassis, and wherein the first side has a surface defined by the layer of abrasion and weather resistant material, with the surface shaped to limit movement of cargo received on the first side of the platform.

2. The folding trailer of claim 1, wherein the platform is polygonal-shaped.

3. The folding trailer of claim 1, wherein the platform is trapezoidal-shaped and is spaced from the front end of the trailer body.

4. The folding trailer of claim 1, wherein the layer of abrasion and weather resistant material encloses the core member.

5. The folding trailer of claim 1, wherein the surface of the first side of the platform defines a plurality of substantially parallel recesses, with each of the recesses separated from an adjacent recess by a rib portion.

6. The folding trailer of claim 5, wherein the platform is polygonal-shaped and includes a first edge and a second edge, and wherein the recesses extend substantially a distance from the first edge to the second edge.

7. The folding trailer of claim 1, wherein the platform is polygonal-shaped and includes a first edge and a second edge, and wherein the surface of the first side inclines from the first edge toward the second edge such that liquid on the surface of the first side flows toward the second edge.

8. The folding trailer of claim 1, wherein the surface of the first side of the platform forms a plurality of raised lip portions positioned on the first side to limit the movement of the cargo received on the first side of the platform.

9. The folding trailer of claim 8, wherein the platform is trapezoidal-shaped and defined by a first edge, a second edge and two lateral edges, and wherein the lip portions are formed along the first edge and along each of the lateral edges of the platform.

10. The folding trailer of claim 1, wherein the chassis includes an extended front support structure supporting the platform.

11. The folding trailer of claim 1, further including a plurality of tie-down loops attached to the first side of the platform for securing the cargo received on the first side of the platform.

12. A folding trailer having an attached cargo platform, comprising:
   a chassis having wheels and a towing hitch;
   a trailer body attached to the chassis such that a front end of the trailer body faces the towing hitch; and
   the platform attached to the chassis between the front end of the trailer body and the towing hitch, the platform comprising:
      a substantially flat and substantially rigid core member; and
      a layer of substantially abrasion and weather resistant material disposed on the core member,
      wherein the platform includes a first side and a second side and is configured to be attached to the chassis such that the second side contacts the chassis, and
      wherein the first side has a surface defined by the layer of abrasion and weather resistant material, with the surface forming a plurality of raised lip portions and defining a plurality of recesses, with each of the recesses separated from an adjacent recess by a rib portion.

13. The folding trailer of claim 12, wherein the platform is polygonal-shaped.

14. The folding trailer of claim 12, wherein the platform is trapezoidal-shaped and is spaced from the front end of the trailer body.

15. The folding trailer of claim 12, wherein the layer of abrasion and weather resistant material encloses the core member.

16. The folding trailer of claim 12, wherein the platform is polygonal-shaped and includes a first edge and a second edge, and wherein the recesses are defined substantially parallel to each other and extend substantially a distance from the first edge to the second edge.

17. The folding trailer of claim 12, wherein the platform is polygonal-shaped and includes a first edge and a second edge, and wherein the surface of the first side inclines from the first edge toward the second edge such that liquid on the surface of the first side flows toward the second edge.

18. The folding trailer of claim 12, wherein the platform is trapezoidal-shaped and defined by a first edge, a second edge and two lateral edges, and wherein the lip portions are formed along the first edge and along each of the lateral edges of the platform.

19. The folding trailer of claim 12, wherein the chassis includes an extended front support structure supporting the platform.

20. A folding trailer having an attached cargo platform, comprising:
   a chassis having wheels and a towing hitch;
   a trailer body attached to the chassis such that a front end of the trailer body faces the towing hitch;
   the platform attached to the chassis between the front end of the trailer body and the towing hitch, the platform comprising:
      a substantially flat and substantially rigid core member; and
      a layer of substantially abrasion and weather resistant material enclosing the core member,
      wherein the platform is trapezoidal-shaped and defined by a first edge, a second edge and two lateral edges, with the platform having a first side and a second side and configured to be attached to the chassis such that the second side contacts the chassis,
      wherein the first side has a surface defined by the layer of abrasion and weather resistant material, with the surface forming a plurality of raised lip portions and defining a plurality of substantially parallel recesses, with each of the recesses separated from an adjacent recess by a rib portion, and
      wherein the lip portions are formed along the first edge and along each of the lateral edges of the platform.

* * * * *